United States Patent
Nukala et al.

(10) Patent No.: US 10,834,056 B2
(45) Date of Patent: Nov. 10, 2020

(54) DYNAMICALLY CONTROLLING FIREWALL PORTS BASED ON SERVER TRANSACTIONS TO REDUCE RISKS

(71) Applicant: CA, Inc., New York, NY (US)

(72) Inventors: Krishna Kumar Yadav Nukala, Telangana (IN); Vikas Pullagura, Andhra Pradesh (IN); Shamayel Mohammed Farooqui, Telangana (IN); Jagadishwara Chary Sriramoju, Telangana (IN); Lakshmi Priya Vennapusa, Andhra Pradesh (IN); Dharanidhar Sahu, Telangana (IN); Ramana Naga Venkata Mittapalli, Telangana (IN)

(73) Assignee: CA, Inc., New York, NY (US)

( * ) Notice: Subject to any disclaimer, the term of this patent is extended or adjusted under 35 U.S.C. 154(b) by 182 days.

(21) Appl. No.: 16/050,081

(22) Filed: Jul. 31, 2018

(65) Prior Publication Data
US 2020/0045015 A1    Feb. 6, 2020

(51) Int. Cl.
*H04L 29/06*    (2006.01)
(52) U.S. Cl.
CPC ........ *H04L 63/029* (2013.01); *H04L 63/1416* (2013.01)
(58) Field of Classification Search
None
See application file for complete search history.

(56) References Cited

U.S. PATENT DOCUMENTS

| 5,918,017 A * | 6/1999 | Attanasio | H04L 29/06 709/224 |
| 8,190,773 B2 * | 5/2012 | Wikman | H04L 63/029 709/245 |
| 9,246,906 B1 * | 1/2016 | Zhou | H04L 63/0807 |
| 2002/0078377 A1 * | 6/2002 | Chang | H04L 63/0218 726/13 |
| 2002/0085491 A1 * | 7/2002 | Beshai | H04Q 3/0091 370/230 |

(Continued)

OTHER PUBLICATIONS

Cameron et al., "Configuring Juniper Networks NetScreen adn SSG Firewalls", ISBN 9780080502847, Dec. 2006.*

*Primary Examiner* — Piotr Poltorak
(74) *Attorney, Agent, or Firm* — Shook, Hardy & Bacon L.L.P.

(57) ABSTRACT

Methods and devices for opening a firewall port for a specified time period are provided. A data packet having a source address and a destination address beyond a firewall transmitted from a process source is intercepted by an interceptor. Responsive to determining, based on the source address, that a firewall port is not open, buffering the data packet. A request comprising an identifier, a protocol identifier, and a time period the firewall port is to be open is transmitted to a firewall controller. The firewall controller authenticates the request based on the identifier and opens a firewall port determined based on the protocol identifier. The interceptor receives an open firewall port notification indicating that the firewall port has been opened and transmits the data packet through the firewall port to the destination address. The firewall controller closes the firewall port when the time period has expired.

18 Claims, 10 Drawing Sheets

(56) References Cited

U.S. PATENT DOCUMENTS

| | | | | | |
|---|---|---|---|---|---|
| 2002/0184316 | A1* | 12/2002 | Thomas | ............ | H04L 29/12009 709/206 |
| 2003/0051155 | A1* | 3/2003 | Martin | ................ | H04L 63/0254 726/11 |
| 2004/0098484 | A1* | 5/2004 | Wuebker | ................ | H04L 63/02 709/227 |
| 2004/0177274 | A1* | 9/2004 | Aroya | ................ | H04L 63/0236 726/13 |
| 2005/0075842 | A1* | 4/2005 | Ormazabal | ............. | H04L 63/02 702/188 |
| 2005/0076235 | A1* | 4/2005 | Ormazabal | ............. | H04L 63/02 726/4 |
| 2005/0089016 | A1* | 4/2005 | Zhang | ................ | H04L 43/00 370/351 |
| 2005/0177869 | A1* | 8/2005 | Savage | ................ | G06F 21/41 726/11 |
| 2005/0198112 | A1* | 9/2005 | Broerman | ............. | H04L 63/083 709/203 |
| 2006/0075478 | A1* | 4/2006 | Hyndman | ........... | H04L 63/0218 726/11 |
| 2006/0215684 | A1* | 9/2006 | Capone | ............ | H04L 63/029 370/437 |
| 2006/0242408 | A1* | 10/2006 | McGrew | ............ | H04L 63/0281 713/168 |
| 2006/0272014 | A1* | 11/2006 | McRae | ............... | H04L 63/1416 726/12 |
| 2007/0067838 | A1* | 3/2007 | Bajko | ................ | H04L 63/029 726/11 |
| 2007/0255861 | A1* | 11/2007 | Kain | ................ | H04L 63/029 710/8 |
| 2007/0300289 | A1* | 12/2007 | Tanizawa | ............ | H04L 63/029 726/3 |
| 2008/0034123 | A1* | 2/2008 | Hirao | ................ | H04L 41/08 709/253 |
| 2008/0072304 | A1* | 3/2008 | Jennings | ............ | H04L 63/0209 726/11 |
| 2009/0086688 | A1* | 4/2009 | Kvache | ............... | H04L 12/2809 370/338 |
| 2009/0106834 | A1* | 4/2009 | Borzycki | ............ | H04L 63/166 726/21 |
| 2009/0113547 | A1* | 4/2009 | Higashikado | ......... | G06F 21/552 726/23 |
| 2010/0183151 | A1* | 7/2010 | Wing | ................ | H04L 63/029 380/257 |
| 2011/0185039 | A1* | 7/2011 | Ueno | ................ | H04L 63/029 709/217 |
| 2011/0276702 | A1* | 11/2011 | Marchev | ............... | H04L 63/029 709/228 |
| 2012/0054358 | A1* | 3/2012 | Yamada | ............. | H04L 12/4625 709/229 |
| 2012/0084187 | A1* | 4/2012 | Sperling | ........... | H04W 12/0802 705/34 |
| 2013/0312097 | A1* | 11/2013 | Turnbull | ................ | G06F 21/55 726/24 |
| 2014/0254574 | A1* | 9/2014 | Schreuder | ........... | H04M 7/0066 370/338 |
| 2016/0036920 | A1* | 2/2016 | Sama | ................ | H04L 63/10 709/203 |
| 2016/0142914 | A1* | 5/2016 | He | ........................ | H04W 12/06 726/12 |
| 2016/0149861 | A1* | 5/2016 | Batke | ................ | H04L 63/10 726/13 |
| 2016/0219077 | A1* | 7/2016 | Pandya | ............... | H04L 63/20 |
| 2017/0078320 | A1* | 3/2017 | Hughes | ............... | H04L 63/1433 |
| 2017/0163691 | A1* | 6/2017 | Alon | ................ | H04L 63/20 |
| 2017/0237778 | A1* | 8/2017 | DiGiambattista | ... | H04L 63/1433 726/1 |
| 2018/0205736 | A1* | 7/2018 | Elyashar | ............... | H04L 63/108 |
| 2019/0007409 | A1* | 1/2019 | Totale | ................ | H04L 9/3213 |
| 2019/0058690 | A1* | 2/2019 | Huang | ................ | H04L 63/0209 |

\* cited by examiner

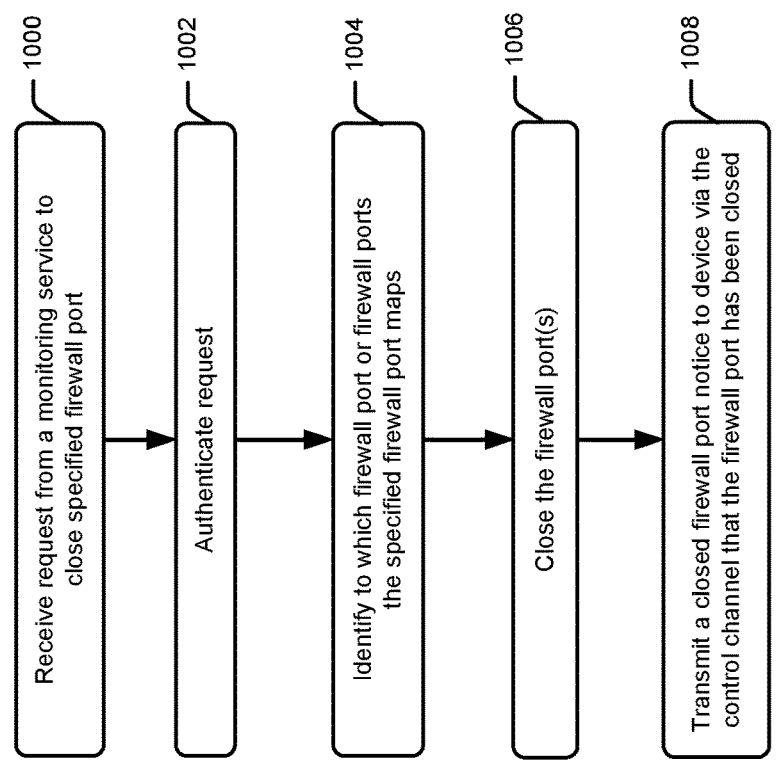
*FIGURE 10*
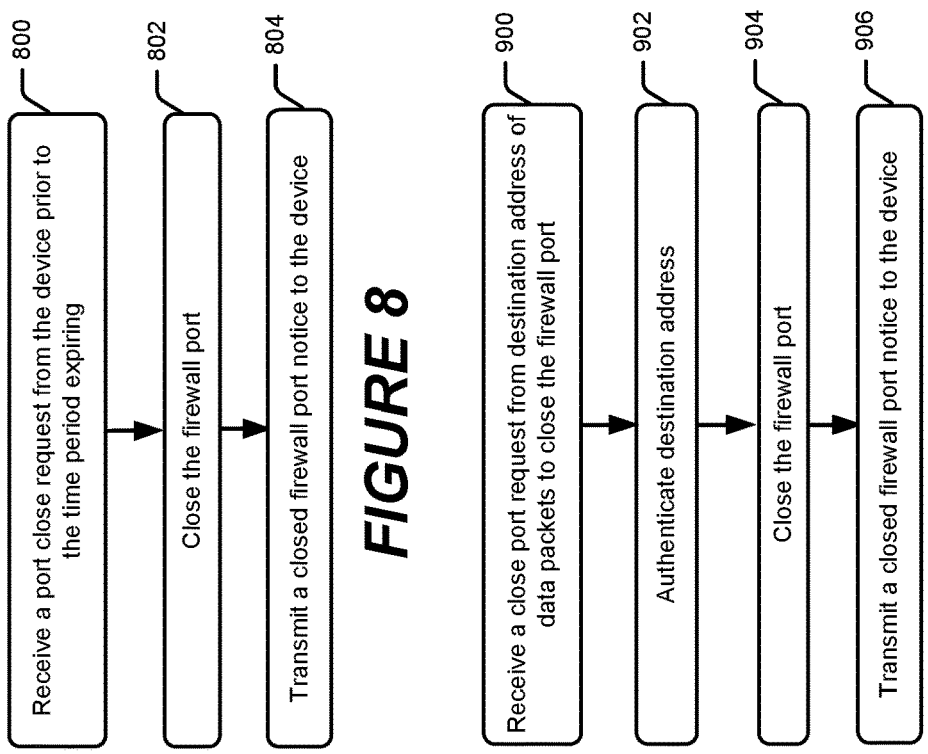
*FIGURE 8*
*FIGURE 9*

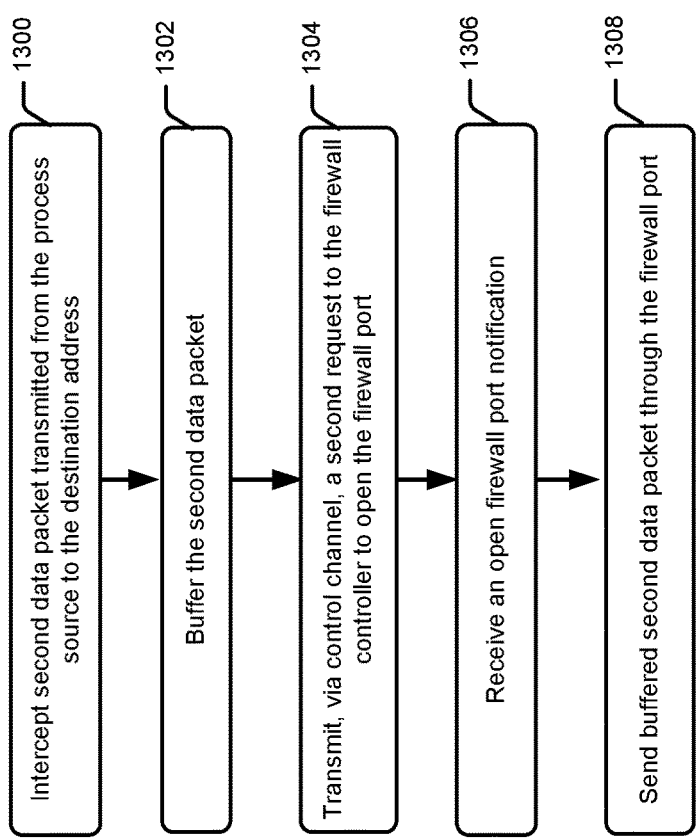
*FIGURE 13*
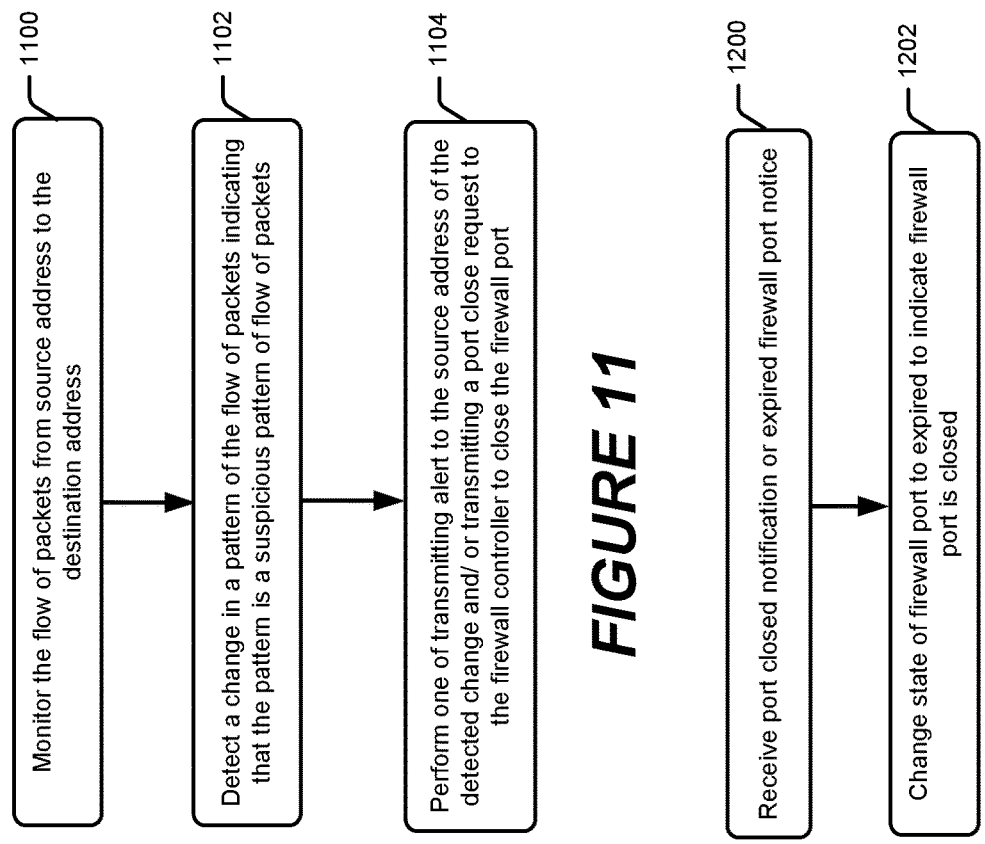
*FIGURE 11*
*FIGURE 12*

DYNAMICALLY CONTROLLING FIREWALL PORTS BASED ON SERVER TRANSACTIONS TO REDUCE RISKS

FIELD

Some embodiments described herein relate to firewalls, and in particular to firewall management.

BACKGROUND

A firewall is part of a network security system that monitors and controls incoming and outgoing network traffic. Network firewalls filter traffic between two or more networks. Host-based firewalls run on host computers and control network traffic in and out of the host computers.

The bulk of Internet communication has typically used either Transmission Control Protocol (TCP) or User Datagram Protocol (UDP) in conjunction with well-known ports. For example, Hypertext Transfer Protocol (HTTP) traffic is transmitted through port 80. To receive traffic, the well-known firewall ports are open for extended periods of time, including being open twenty-four hours a day for seven days a week (24×7). Other ports that do not have continuous traffic are often opened and left open. For example, Microsoft SQL DB traffic and Oracle DB traffic may have bursts of traffic, but not continuous traffic. The corresponding ports are port 1433 for the Microsoft SQL DB and port 1521 for the Oracle DB traffic. Another example of ports not having continuous traffic are the ports associated with auditing finance of one company by an auditing company where the auditing company will need the ports opened temporarily during auditing. Administrators often open these ports and leave them open.

Firewall ports that are open for such long periods of time present security risks as hackers can scan open firewall ports and attack the open firewall ports for extended periods of time to gain access to the network protected by the firewall.

SUMMARY

Some embodiments are directed to a method for limiting the time a firewall port is open. The method includes receiving, via a control channel, a request from a device to open a port of a firewall controlled by the firewall controller. The request includes information including an identifier, a protocol identifier, and a time period the port of the firewall is to be open. Responsive to authenticating the request based on the identifier, the method selects a firewall port among a set of firewall ports of the firewall to open based on the protocol identifier. The method opens the firewall port to allow data packets to pass through the firewall port. The method transmits, via the control channel, an open firewall notification to the device indicating that the firewall port is open. Responsive to the time period expiring, the method closes the firewall port and transmits, via the control channel, an expired firewall port notice to the device. The expired firewall port notice provides an indication that the firewall port has been closed.

The method may further include receiving, from a monitoring service, a request to close a specified firewall port. Responsive to authenticating the request, the method identifies that the specified firewall port maps to the firewall port among the set of firewall ports and closes the firewall port. A notification may be transmitted to the device via the control channel that the firewall port has been closed.

Corresponding firewall controllers are disclosed. In some embodiments, the firewall controller includes a communication interface and a processor operatively coupled to the communication interface. The processor performs operations including receiving, via a control channel, a request from a device to open a port of a firewall. The request includes an identifier, a protocol identifier and a time period the port is to be opened. Responsive to authenticating the request based on the identifier, the operations selects a firewall port among a set of firewall ports of the firewall to open based on the protocol identifier and opens the firewall port to allow data packets to pass through. The operations transmit, via the control channel, an open firewall port notification to the device indicating that the firewall port is open. Responsive to the time period expiring, the operations close the firewall port and transmit, via the control channel, an expired firewall port notice to the device. The expired firewall port notice includes an indication that the firewall port has been closed.

In some embodiments, a method intercepts a data packet transmitted from a process source. The data packet has a process source identifier of the process source, a source address, and a destination address that is beyond a firewall. The method determines if a firewall port of a firewall is open for the packet to be sent to the destination address from the process source responsive to authenticating the process source based on the process source identifier. Responsive to determining the firewall port is not open, the method buffers the data packet and transmits, via a control channel, a request to a firewall controller to open the firewall port. The request includes information including an identifier, a protocol identifier, and a time period the firewall port is to be open. The method receives, via the control channel, an open firewall port notification indicating that the firewall port has been opened and sends the buffered data packet through the firewall port. Responsive to determining the firewall port is open, the method sends the data packet through the firewall port Determining if the firewall port is open may include determining if an interceptor state table contains an entry comprising the source address, the destination address, the protocol identifier, an identification of the firewall port, and a state of the firewall port indicating that the firewall port is active.

Corresponding server devices are disclosed. In some embodiments, a server device includes a plurality of process sources, each having a unique process source identifier. The server device further includes an interceptor circuit. The interceptor circuit intercepts a data packet having a process source identifier and transmitted from one of the plurality of process sources, the data packet having a source address and a destination address that is beyond a firewall. Responsive to authenticating the one of the plurality of process sources based on the process source identifier, the interceptor circuit determines, based on the source address, if a firewall port is open for the data packet to be sent to the destination address from the source address. Responsive to a determination that the firewall port is not open, the interceptor circuit buffers the data packet in a buffer circuit and transmits, via a control channel, a request to a firewall controller to open the firewall port. The request includes information including an identifier, a protocol identifier, and a time period the port of the firewall is to be open. The interceptor circuit receives, via the control channel, an open firewall port notification indicating that the firewall port has been opened. The interceptor circuit sends the buffered data packet through the firewall port to the destination address. Responsive to a determination that the firewall port is open, the interceptor circuit sends the data packet through the firewall port to the destination address. The interceptor circuit receives an expired firewall port notice comprising an indication that the firewall port has been closed due to the time period expiring.

The server device may further include a monitoring circuit that monitors the flow of packets from the source address to the destination address through the firewall port and detect a change in a pattern of the flow of packets, the change indicating that the pattern is a suspicious pattern of flow of packets. Responsive to detecting the change in the pattern, the server device performs one of sending an alert to the process source associated with the source address of the detected change or transmitting a port close request to the firewall controller to close the firewall port.

It is noted that aspects of the inventive concepts described with respect to one embodiment may be incorporated in different embodiments although not specifically described relative thereto. That is, all embodiments or features of any embodiments can be combined in any way and/or combination. These and other objects or aspects of the present inventive concepts are explained in detail in the specification set forth below.

Advantages that may be provided by the present inventive concepts include opening a firewall port for a defined period of time and closing the firewall port when the defined period of time expires. Closing the firewall ports results in fewer attacks by hackers against the firewall and against application services using the firewall ports. By only opening the firewall ports for the specified time period, the time the firewall port is open can be significantly reduced when compared to leaving firewall ports open 24×7, especially for those situations where the port only needs to be open for a limited period of time.

Other systems, methods, or computer program products, and advantages will be or become apparent to one with skill in the art upon review of the following drawings and detailed description. It is intended that all such additional systems, methods, or computer program products and advantages be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings:

FIG. 8 is a flowchart illustrating operations to close a firewall port responsive to receiving a request from a server prior to a time period expiring according to some embodiments.

FIG. 9 is a flowchart illustrating operations to close a firewall port responsive to receiving a request from a destination server according to some embodiments.

FIG. 10 is a flowchart illustrating operations to close a firewall port responsive to a request from a monitoring service according to some embodiments.

FIG. 11 is a flowchart illustrating operations to monitor the flow of packets from a source address to a destination address according to some embodiments.

FIG. 12 is a flowchart illustrating operations to set a state of an interceptor state table to an expired state according to some embodiments.

FIG. 13 is a flowchart illustrating operations to re-open a firewall port according to some embodiments.

DETAILED DESCRIPTION OF EMBODIMENTS

Figure 1:
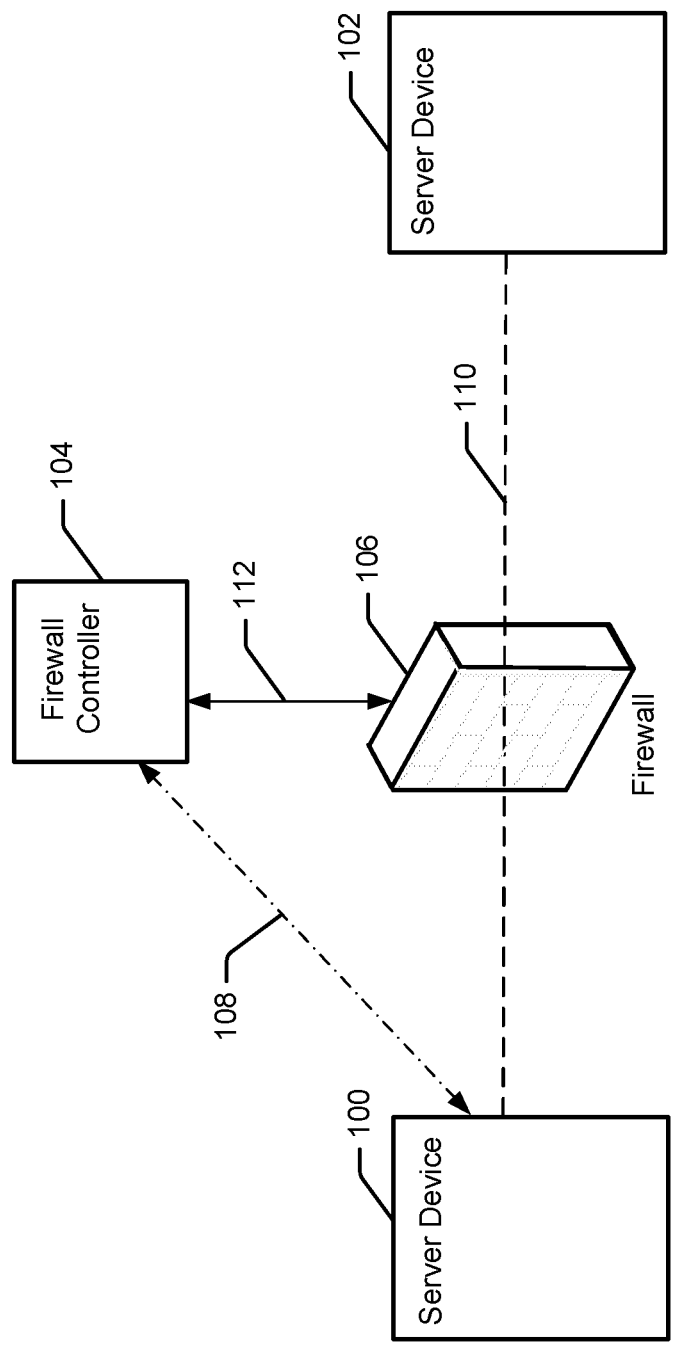
FIG. 1 is a block diagram illustrating a server communicating with a firewall controller to open a port to send packets through a firewall port to a destination server according to some embodiments.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide methods or systems for opening a firewall port for a specified time period. According to some embodiments, a request from a device to open a port of a firewall is received by a firewall controller via a control channel. The request comprises an identifier, a protocol identifier, and a time period the port of the firewall is to be open. The request may include a firewall port number. Responsive to authenticating the request based on the identifier, a firewall port among a set of firewall ports of the firewall to open is selected based on the protocol identifier. The firewall port is opened to allow data packets to pass through the firewall port. An open firewall notification is transmitted via the control channel to the device indicating the firewall port is open. Responsive to the time period expiring, the firewall port is closed and an expired firewall port notice is transmitted via the control channel to the device. If the request includes the firewall port number, the firewall port is selected based on the protocol identifier and the firewall port number.

FIG. 1 is a block diagram illustrating a system for opening a firewall port according to an embodiment. As shown, a source server device 100 wanting to send data packets to a destination server 102 sends a request to a firewall controller 104 to open a port of the firewall 106 via a control channel 108 to send data packets to destination server 102 via data channel 110. The firewall controller 102 communicates with the firewall 104 via channel 112.

Figure 2:
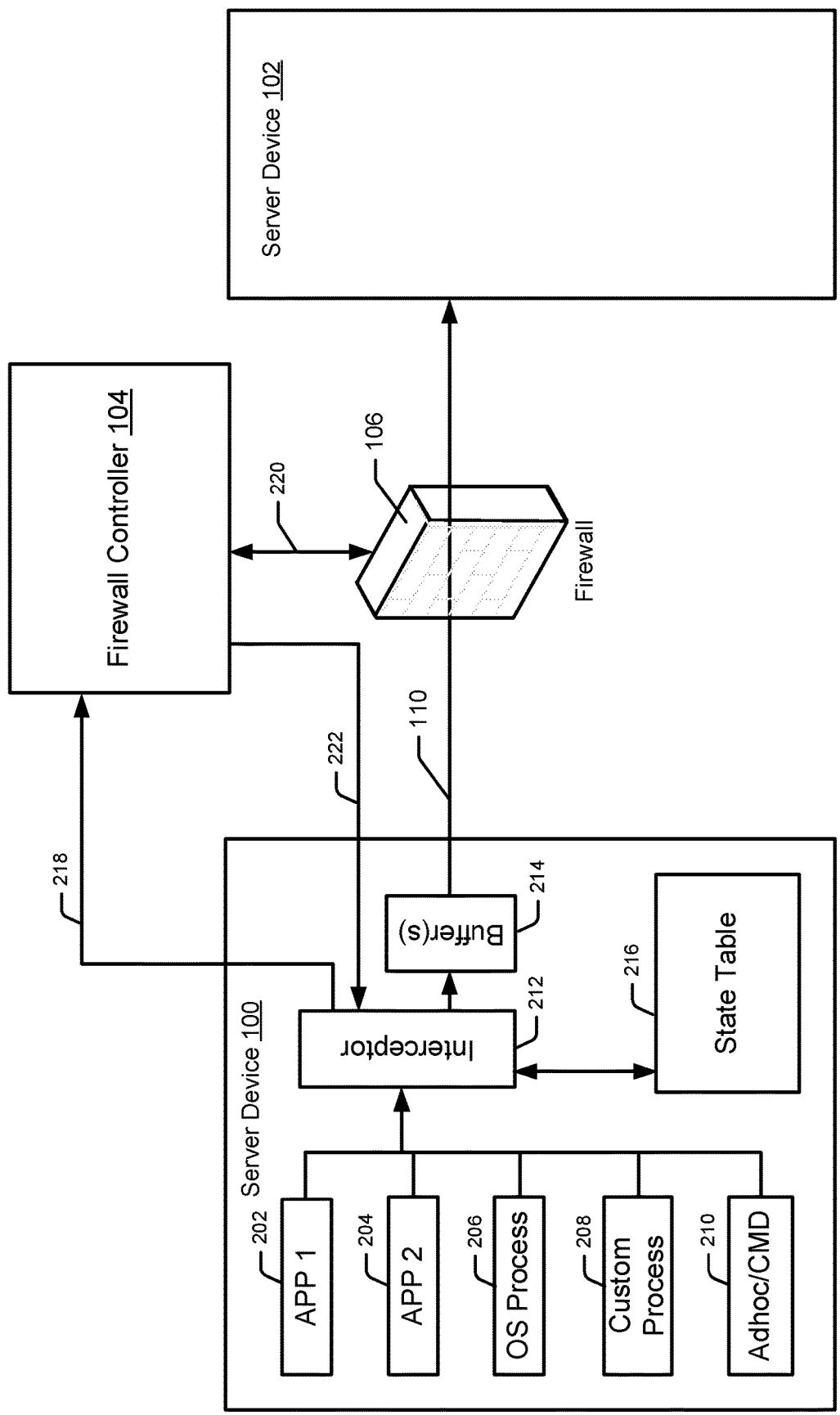
FIG. 2 is a block diagram of a server according to some embodiments.

Turning to FIG. 2, the server device 100 may include process sources such as applications 202, 204, operating system process(es) 206, custom process(es) 208, and Adhoc/command interface (Adhoc/CMD) 210 sending data packets via one or more data channels 110 to destination server 102 via a port of firewall 106. In order to send data packets, the applications 202, 204, OS Process 206, Custom Process 208 and Adhoc/CMD 210 register with interceptor 212.

The interceptor 212 intercepts each data packet sent towards the firewall and authenticates the process source identifier of the data packet. This is accomplished in one embodiment by verifying that the process source (e.g., one of the applications 202, 204, operating system process(es) 206, custom process(es) 208, or Adhoc/command interface (Adhoc/CMD) 210) has successfully registered with the interceptor 212. The interceptor 212 discards the data packet if the process source is not registered.

The interceptor 212 buffers the data packet in buffer(s) 214 if the process source is registered and determines if a firewall port is open for the data packet by checking an interceptor state table 216. The interceptor state table 216 has three states. The three states are establishing, active, and expired. The establishing state indicates the firewall port is being established. The active state indicates the firewall port is open. The expired state indicates the firewall port is closed due to the time period having expired or has been closed for other reasons such as a request to close the firewall port before the time period has expired. If the state table 216 indicates a port has an active state indicating the port is open for the data packet, the interceptor 212 transmits the data packet to the destination address (e.g., destination server 102) via data channel 110 (not shown).

If the interceptor state table 216 indicates the firewall port is being established, the interceptor buffers the data packet until the firewall port is opened. If the interceptor state table 216 indicates the firewall port is closed (i.e., has an expired state), a request 218 to open a firewall port is sent via control channel 108. The request 218 includes an identifier of the interceptor 212, a protocol identifier that identifies a protocol of the data packet, and a time period that the firewall port is to be open. In one embodiment, the request further includes a source address specified in the data packet and a destination address specified in the data packet.

The time period specified is based on the type of the packet. For example, if the data packet contains a single operation like a ping command, a short time period such as one microsecond is selected. If the type of data packet is part of a video and/or audio stream, a longer time period is selected. The time periods in one embodiment are 1 µs, 10 µs, 100 µs, 1 ms, 10 ms, 100 ms, 1 s, 2 s, 3 s, 4 s, . . . 10 s, . . . .

If the interceptor 212 is registered with the firewall controller 104, the firewall controller will open the firewall for the time period specified in the request via control channel 220. Once the firewall port is open, the firewall controller 104 sends an indication 222 to the interceptor 212 via control channel 110 (not shown).

Figure 3A:
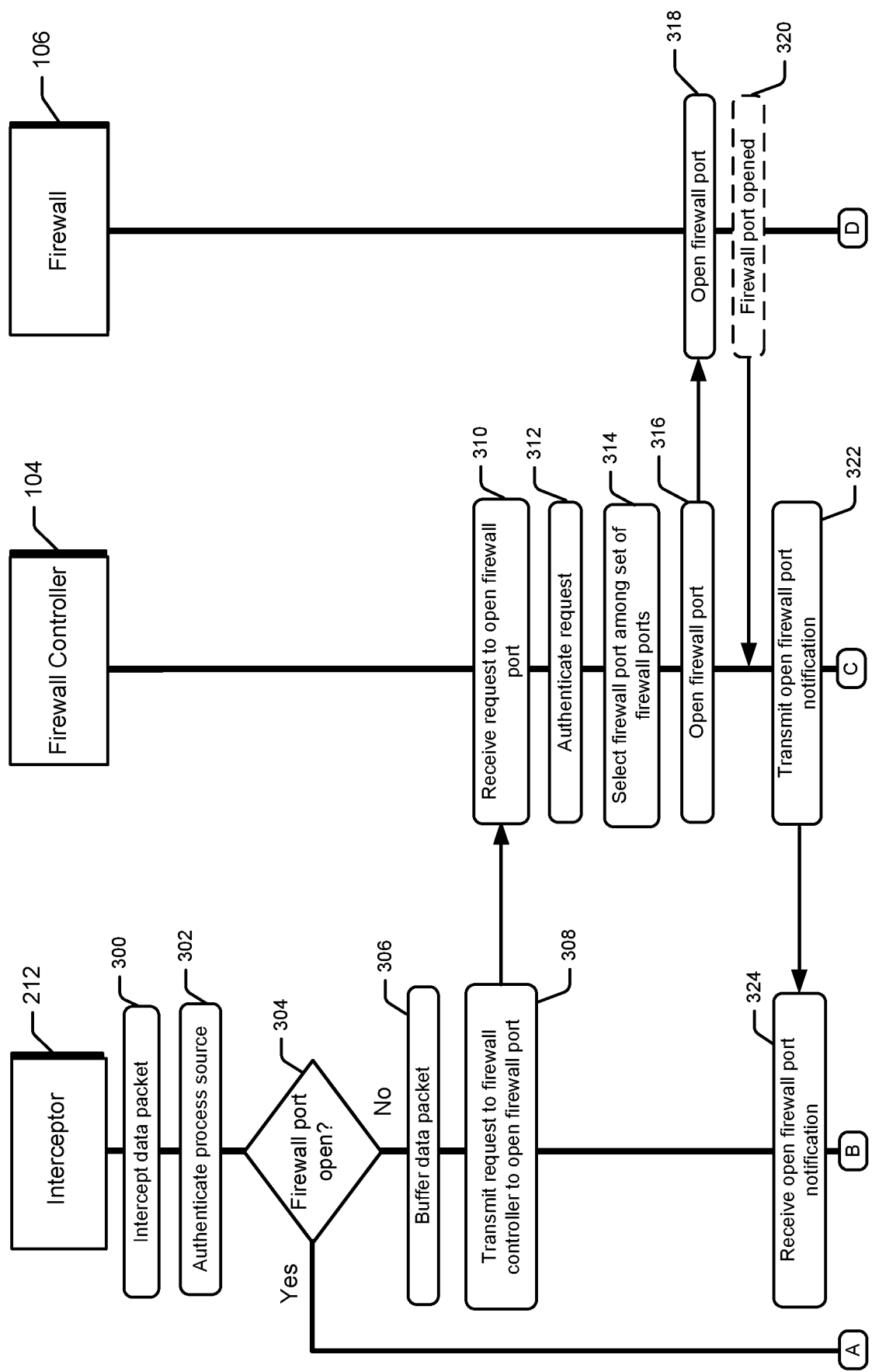
FIGS. 3A-3B are an exemplary signaling diagram for illustrating procedures according to an embodiment.
Figure 3B:
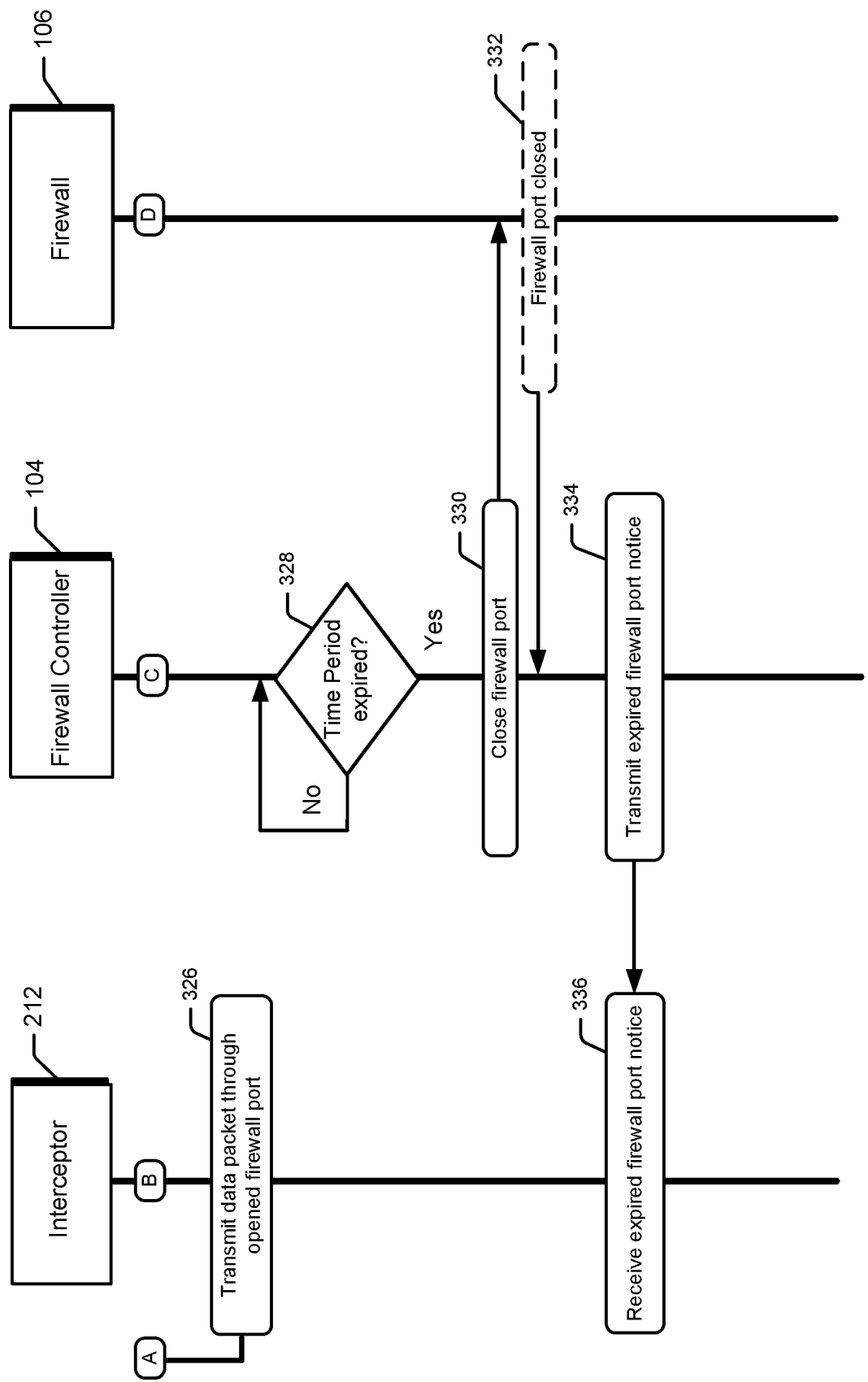

FIGS. 3A and 3B are a signaling diagram of an exemplary procedure that includes opening a firewall port for a specified time period and closing the firewall port responsive to the specified time period expiring. The procedures of FIGS. 3a and 3B involve the interceptor 212 of server device 100, the firewall controller 104 and the firewall 106. Initially, at step 300, the interceptor 212 intercepts a data packet from a source (e.g., one of the applications 202, 204, operating system process(es) 206, custom process(es) 208, or Adhoc/command interface (Adhoc/CMD) 210).

Figure 4:
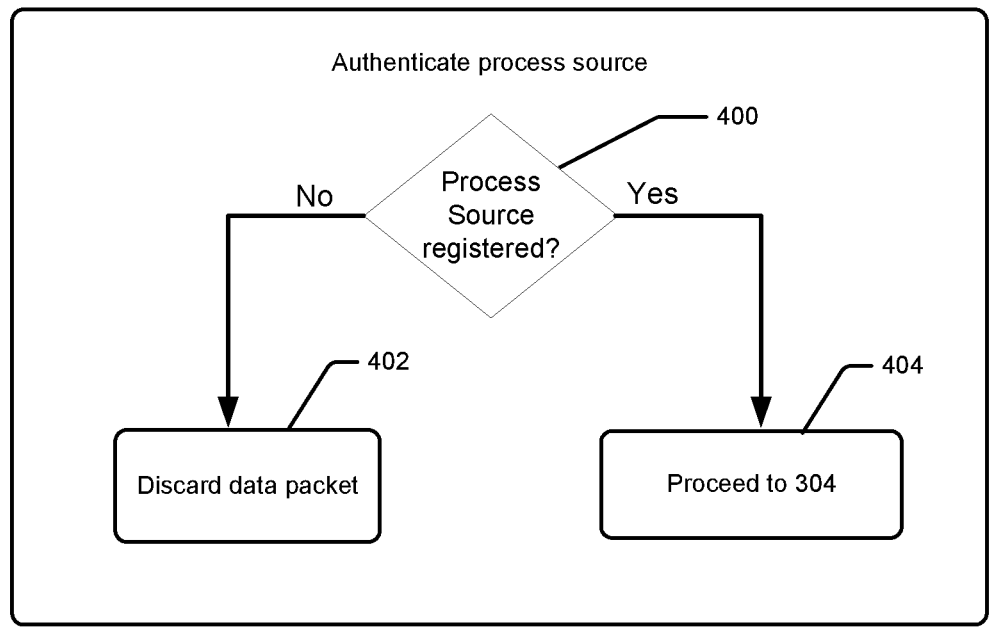
FIG. 4 is a flowchart illustrating operations to authenticate a source address according to some embodiments.

At optional step 302, the interceptor 212 authenticates the process source based on the process source identifier (e.g., identifier of one of the applications 202, 204, operating system process(es) 206, custom process(es) 208, or Adhoc/command interface (Adhoc/CMD) 210). Turning to FIG. 4, in one embodiment, the interceptor 212 authenticates the process source by determining if the process source is registered at step 400 based on the process source identifier. If the process source is not registered, the interceptor 212 discards the data packet at step 402. If the process source is registered, the interceptor proceeds to step 304.

Figure 5:
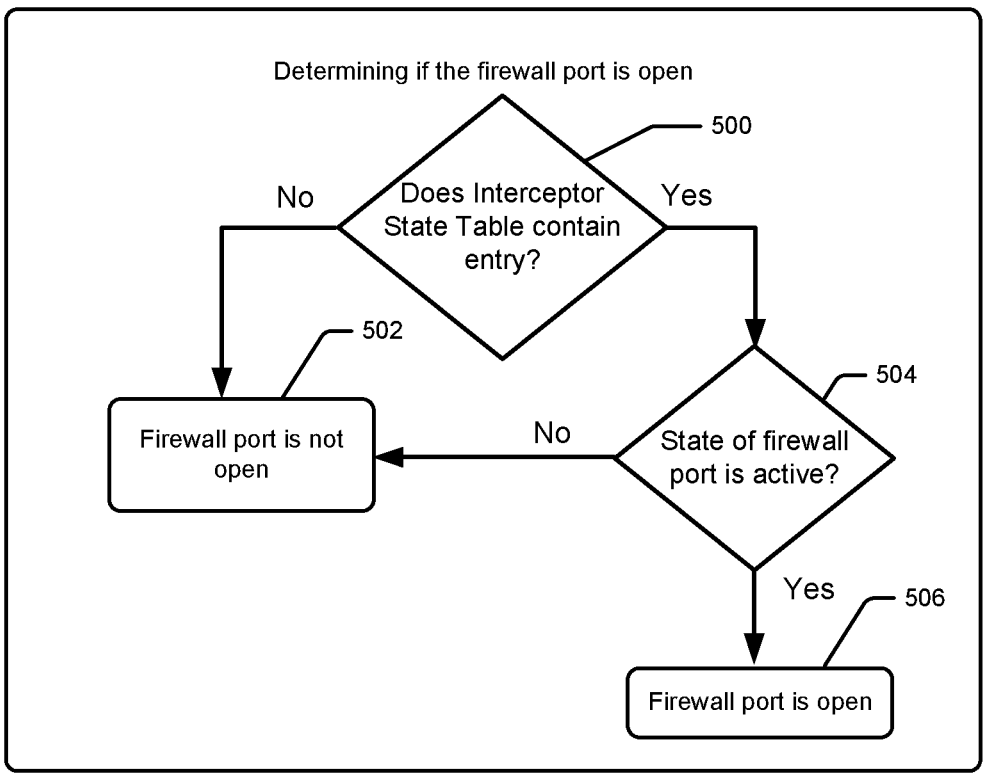
FIG. 5 is a flowchart illustrating operations to determine if a firewall port is open according to some embodiments.

Returning to FIG. 3A, at step 304, the interceptor 212 determines if the firewall port is open. The interceptor 212 may buffer the data packet while determining if the firewall port is open. Turning to FIG. 5, in one embodiment, the interceptor 212 determines if the firewall port is open by checking if the interceptor state table 216 contains a table entry at step 500 having the source address, protocol type, and destination address specified in the data packet. If a firewall port is specified in the data packet, the interceptor state table 216 is checked to determine if the interceptor state table 216 contains a table entry having the source address, protocol type, destination address, and firewall port number specified in the data packet. If there is no table entry, the firewall port is determined to not be open at step 502. If the interceptor table contains the table entry, the interceptor 212 determines if the state of the firewall port specified in the table entry is an active state at step 504. If the state of the firewall port specified in the table is an active state, then the firewall port is determined to be open at step 506. If the state of the firewall port specified in the table entry is either an "establishing" state or an "expired" state, the firewall port is not open.

Figure 7:
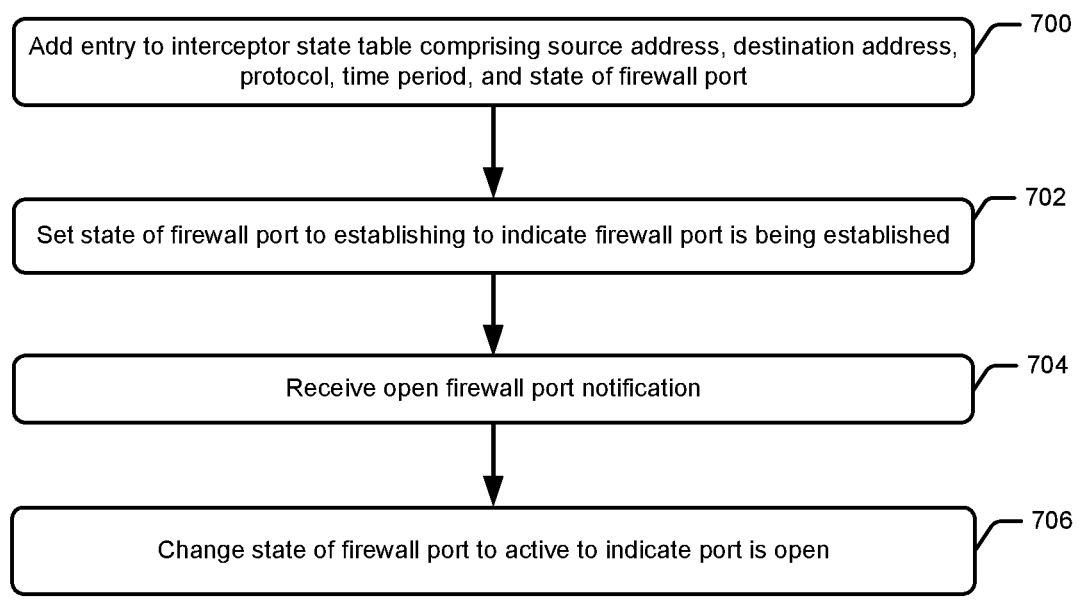
FIG. 7 is a flowchart illustrating operations to set and update a state of an interceptor state table according to some embodiments.

Returning to FIG. 3A, if the firewall port is not open, the interceptor 212 buffers the data packet in buffer(s) 214 at step 306. At step 308, the interceptor 212 transmits a request to the firewall controller 104 to open a firewall port via the control channel. The control channel may be a secure channel In one embodiment, the request comprises an identifier of the interceptor 212, a protocol identifier that identifies a protocol of the data packet, and a time period that the firewall port is to be open. The request may further include a source address specified in the data packet and a destination address specified in the data packet. A firewall port number may also be included in the request. Turning to FIG. 7, the interceptor 212, at step 700, adds an entry to the interceptor state table 216 responsive to the interceptor 212 transmitting the request to open a firewall port to the firewall control 104. The entry includes the source address of the data packet, the protocol of the data packet, the time period the firewall will be open, and the state of the firewall port. The entry may also include the destination address and the firewall port number of the data packet. At step 702, the state of the firewall port is set to "establishing" to indicate the firewall port is being established.

In an embodiment, when the state specified in the table entry is establishing, the interceptor 212 buffers subsequent data packets from the process source having the same destination address, protocol type, and firewall port number if the data packet has a firewall port number. The interceptor 212 will not send another request to the firewall controller for the subsequent data packets during the period the state table indicates the state of the firewall port is establishing. And all other subsequent packets of the same entries, will wait in the buffer until the state changes to "active." Responsive to the state changing to "active," the buffered data packets will be transmitted through the open firewall port to the destination address.

Figure 6:
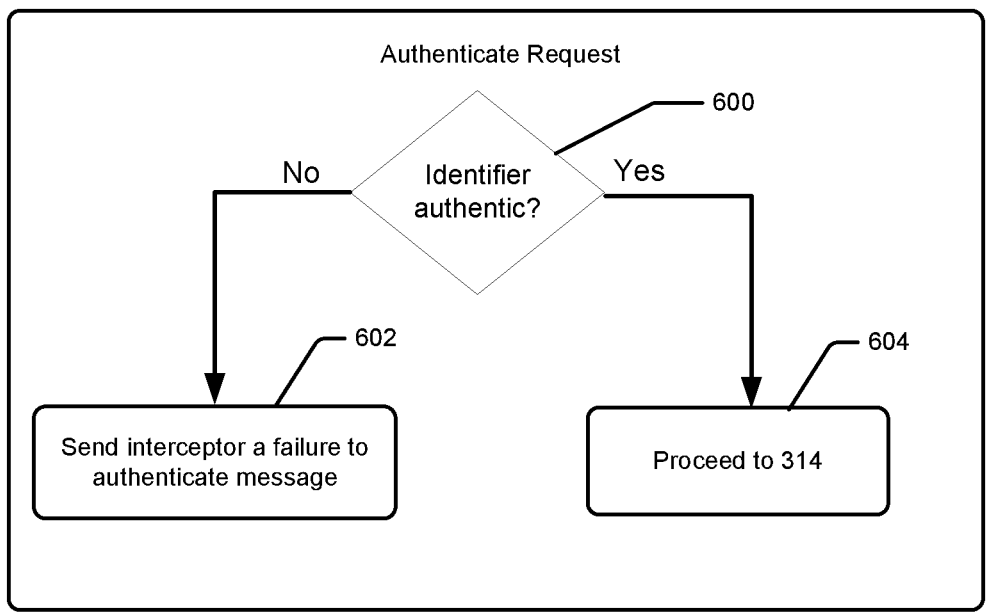
FIG. 6 is a flowchart illustrating operations to authenticate a request to open a firewall port according to some embodiments.

Returning to FIG. 3A, at step 310, the firewall controller 104 receives the request to open a firewall port. The firewall controller 104 authenticates the request at step 312 based on the identifier. Turning to FIG. 6, in one embodiment, the firewall controller authenticates the request by determining if the identifier of the interceptor 212 is an authentic identifier at step 600. The identifier is authentic if the interceptor 212 has registered with the firewall controller 104. In other embodiments, the interceptor 212 provides a password with the request and the firewall controller authenticates the request by verifying the password is correct. In one embodiment, the firewall controller 104 assigns a unique identifier to each registered interceptor and shares a public key with all registered interceptors. The interceptor 212 generates a secure string with the public key and the unique identifier assigned to the interceptor 212 and uses the secure string as the identifier in every communication with the firewall controller 104. If the request is an authentic request, at step 604, the firewall controller 104 proceeds to step 314.

Returning to FIG. 3A, the firewall control selects a firewall port among a set of firewall ports at step 314. The selection is based on the protocol of the data packet. For example, if the protocol identifies the data as a Microsoft SQL DB packet, then the selected firewall port will be port 1433. If the protocol identifies the data packet as an Oracle DB packet, then the selected firewall port will be port 1521. If the protocol identifies the data packet as a custom type, then the firewall port specified in the data packet is selected. Once the firewall port is selected, at step 316, the firewall controller 104 transmits a command to open the selected firewall port to the firewall 106.

At step 318, the firewall 106 opens the selected firewall port. The firewall 106 may transmit to the firewall controller an indication that the selected firewall port has been opened at step 320. At step 322, the firewall controller 104 transmits an open firewall port notification to the interceptor 212. The firewall controller 104 may set up at least one rule for the selected firewall port to only allow data packets having a source address and a destination address to flow through the selected firewall port. In other embodiments, a rule for the selected firewall port may be a rule that allows all data packets that have the destination address to flow through the selected firewall port, a rule that allows data packets that have the address of the process source to flow through the selected firewall port, a rule that allows any data packet to flow through the selected firewall port, etc.

At step 324, the server device 100 receives the open firewall port notification. Returning to FIG. 7, at step 704, the server device 100 receives the open firewall port notification. At step 706, the server device 100 changes the state of the firewall port in the entry for the data packet in the interceptor state table to an "Active" state to indicate the firewall port is open.

Turning to FIG. 3B, if the firewall port is open at step 304 or responsive to the receiving the open firewall port notification at step 324, the interceptor 212 transmits the data packet through the opened firewall port at step 326.

At step 328, the firewall controller determines if the time period specified in the request to open the firewall port has expired. For example, when the firewall controller 104 receives the firewall port open notification from the firewall 106, the firewall controller 104 may set a timer corresponding to the time period specified in the request to open a firewall port. When the timer expires, the firewall controller 104 transmits a close firewall port command to the firewall 106 at step 330. At optional step 332, the firewall 106 transmits a firewall port closed notification to the firewall controller 104. At step 334, the firewall controller 334 transmits an expired firewall port notice to the interceptor 212. At step 336, the interceptor 212 receives the expired firewall port notice at step 336.

Prior to the time period expiring, the firewall controller 104 may receive a request to close the firewall port from the interceptor 212, from the destination server 102, or from a monitoring service.

FIG. 8 illustrates an embodiment where the interceptor 212 transmits the request to close the firewall port. At step 800, the firewall controller 104 receives a port close request from the interceptor 212 to close the firewall port prior to the time period expiring. This may occur due to the interceptor 212 determining no additional data packets have been transmitted from the source address or received from the destination address for a pre-determined time period. Other reasons this may occur is the server 102 being shut down, suspicious traffic has been detected by the interceptor 212 or another circuit in the server device 100, the process source being closed or terminated, and the like. At step 802, the firewall controller 104 closes the firewall port. Any timers that were started when the firewall port was opened may be stopped when the firewall port is closed. At step 804, the firewall controller 104 transmits a closed firewall port notice to the interceptor 212 via the control channel 108.

FIG. 9 illustrates an embodiment where the destination address (e.g., server 102) transmits the request to close the firewall port. At step 900, the firewall controller 104 receives a close port request from the destination address of the data packet to close the firewall port. Reasons this may occur is the destination address is being shut down, suspicious traffic has been detected by the destination server 102, too much traffic is being received by the destination address or the destination server 102, and the like. The destination address must be registered with the firewall controller 104. The firewall controller 104 authenticates the destination address at step 902 to determine if the destination address is registered with the firewall controller 104. Responsive to the destination address being authenticated, the firewall controller closes the firewall port at step 904. At step 906, the firewall controller 104 transmits a closed firewall port notice to the interceptor 212 via the control channel 108.

FIG. 10 illustrates an embodiment where a monitoring service transmits the request to close a specified firewall port to the firewall controller 104. The monitoring service may be located in server device 100, be part of the interceptor 212, located in server 102, or located in another device. At step 1000, the firewall controller 104 receives a close port request from the monitoring server to close a specified firewall port. The specified firewall port may be a single firewall port, multiple firewall ports, or all firewall ports. Reasons for the monitoring service to transmit the request include detecting suspicious traffic in the specified firewall port. The suspicious traffic may be detected by pattern recognition, detecting a computer virus or other malware in the data packets, and the like. For example, FIG. 11 illustrates an embodiment to detect suspicious traffic. At step 1100, the monitoring service monitors the flow of packets from a source address to a destination address. At step 1102, the monitoring service detects a change in the pattern of flow of data packets indicating that the pattern is a suspicious pattern of flow of packets. At step 1104, the monitoring service transmits an alert to the source address of the detected change and/or transmits a port close request to the firewall controller to close the specified firewall port. In an embodiment, the alert may be sent to the interceptor 212.

Returning to FIG. 10, at step 1002, the firewall controller 104 authenticates the request to determine if the monitoring service is registered with the firewall controller 104. Responsive to the request being authenticated, the firewall controller 104 identifies to which firewall port or firewall ports the specified firewall port maps at step 1004. At step 1006, the firewall controller 104 closes the firewall port(s). At step 1008, the firewall controller 104 transmits a closed firewall port notice to the interceptor 212 in server device 100 via the control channel 108 to inform the interceptor 212 that the firewall port has been closed.

The interceptor 212 updates the interceptor state table when the interceptor 212 receives an indication that the firewall port has been closed. Turning to FIG. 12, at step 1200, the interceptor 212 receives a port closed notification or an expired firewall port notice. At step 1202, the interceptor 212 updates the entry in the interceptor state table 216 associated with the firewall port in the port closed notification or the expired firewall port notice to change the state of the firewall port to expired to indicate the firewall port has been closed.

Once a firewall port has been closed, a new request to open the firewall port has to be transmitted to the firewall controller 104. Turning to FIG. 13, at step 1300, the interceptor 212 intercepts additional data packets having the process source identifier being transmitted from a source address to be transmitted to the destination address. The interceptor 212 determines from the interceptor state table 216 that the firewall port has been closed. The interceptor 212 buffers the additional packets at step 1302. The interceptor 212, at step 1304 transmits, via the control channel 108, a second request to the firewall controller 104 to open a firewall port. The firewall controller 104 repeats steps 310 to 316, 322, 328-330, and 334 for the additional data packets. At step 1306, the interceptor 212 receives an open firewall port notification from the firewall controller 104. The interceptor 212 sends the additional data packets through the firewall port at step 1308. The interceptor also performs steps 700-706 and steps 1200-1202 for the additional data packets.

Figure 14:
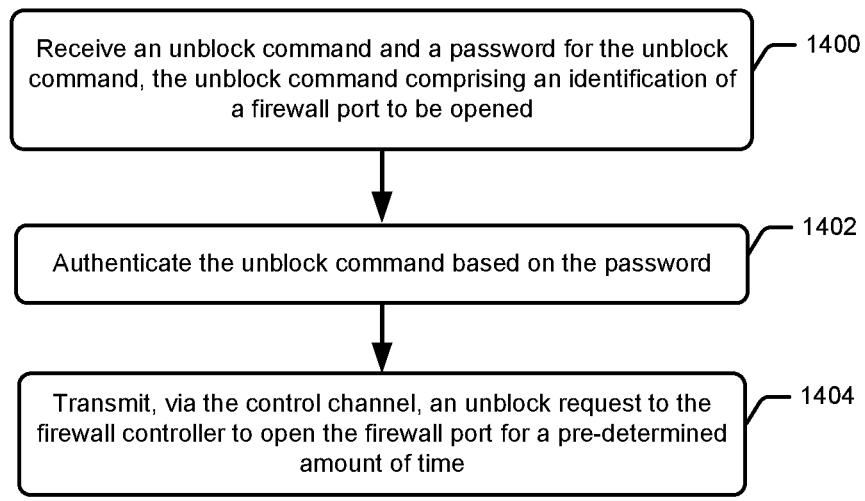
FIG. 14 is a flowchart illustrating operations to open a firewall port responsive to receiving an unblock command according to some embodiments.

In one embodiment, users such as administrators may need to open a firewall port to transmit or receive files such as software updates, reports, and other files to other devices such as server 102. An unblock command is used to open a firewall port for a pre-determined time period. The unblock command is password protected to prevent unauthorized users from using the unblock command Turning to FIG. 14, at step 1400, the interceptor 212 receives an unblock command that includes an identification of a firewall port to be opened and the password to use the unblock command. At step 1402, the interceptor 212 authenticates the unblock command based on the password. If the password is authenticated, the interceptor 212 transmits, via the control channel 108, an unblock request to the firewall controller 104 to open the firewall port identified in the unblock request for the pre-determined time period at step 1404. The firewall controller 104 repeats steps 310 to 316, 322, 328-330, and 334 for the unblock request. When the interceptor 212 receives the open firewall port notification, the interceptor 212 sends a notification to the user that sent the unblock command that the firewall port is open. Data packets transmitted to the firewall port are intercepted by the interceptor 212 and transmitted through the open firewall port to the destination address/addresses specified in the data packets. Once the pre-determined time period is over, the firewall controller 104 closes the firewall port identified in the unblock request.

Figure 15:
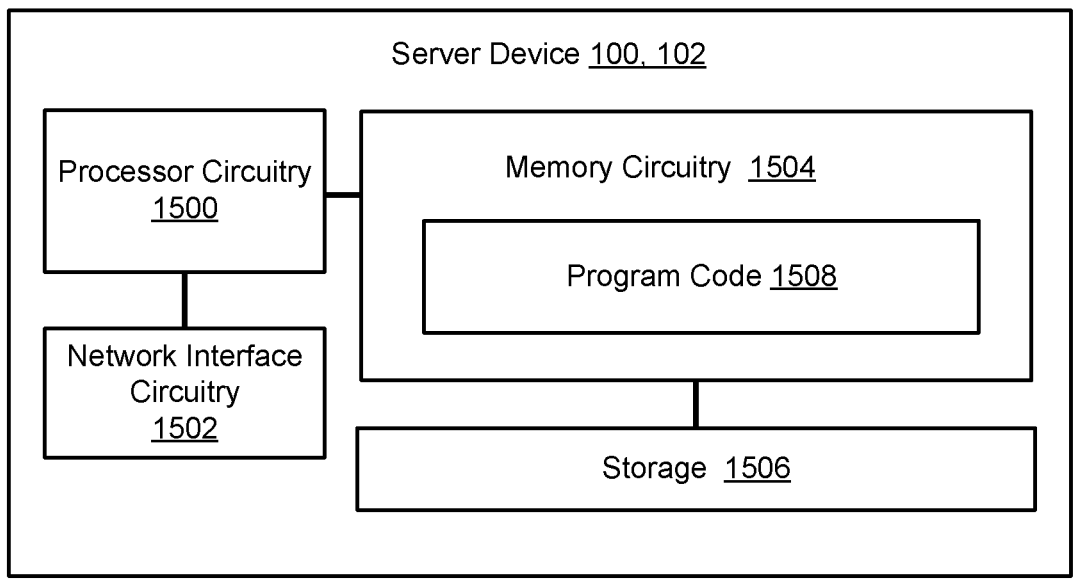
FIG. 15 is a block diagram of a server according to some embodiments.

FIG. 15 provides an overview diagram of a suitable computer hardware and computing environment in conjunction with which various embodiments of the server device 100, 102 may be practiced. The description of FIG. 15 is intended to provide a brief, general description in conjunction with which the subject matter described herein may be implemented. In some embodiments, the subject matter is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 15, a hardware and operating environment is provided that is applicable to the server device 100, 102 described above. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 15, a hardware and operating environment is provided that is applicable to the server device shown in the other figures. As shown in FIG. 15, one embodiment of the hardware and operating environment includes processing circuitry 1500 having one or more processing units coupled to the network interface circuitry 1502 and a memory circuitry 1504. The memory circuitry 1504 may include a ROM, e.g., a flash ROM, a RAM, e.g., a DRAM or SRAM, or the like and includes suitably configured program code 1508 to be executed by the processing circuitry so as to implement the above described functionalities of the server. The storage 1506 may include a mass storage, e.g., a hard disk or solid state disk, or the like. There may be only one or more than one processing unit, such that the processor circuitry 1500 of server device 100, 102 comprises a single central-processing unit (CPU), or a plurality of processing units, commonly referred to as a multiprocessor or parallel-processor environment. A multiprocessor system can include cloud computing environments.

Figure 16:
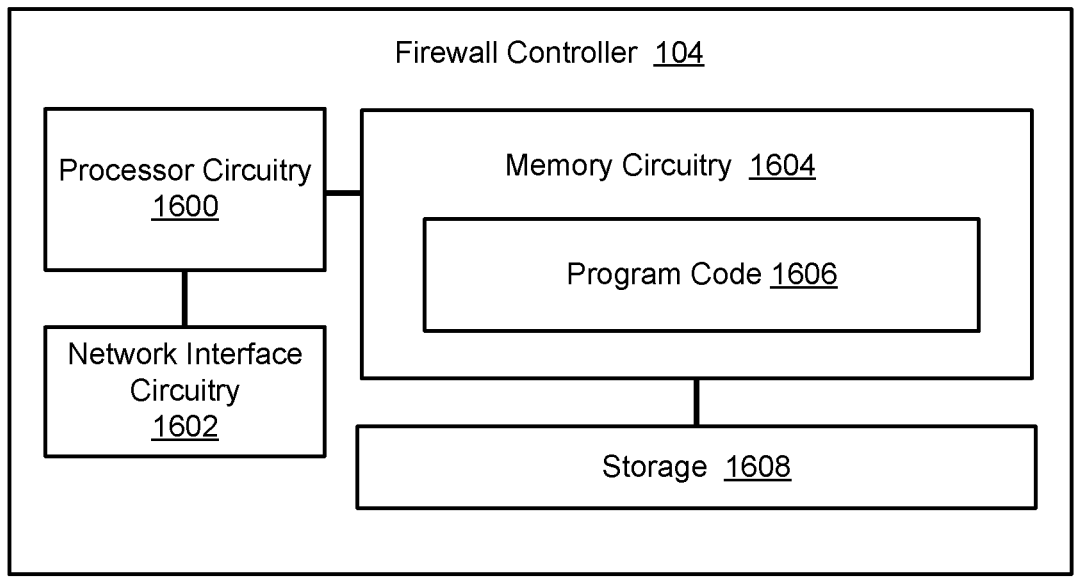
FIG. 16 is a block diagram of a firewall controller according to some embodiments.

FIG. 16 provides an overview diagram of a suitable computer hardware and computing environment in conjunction with which various embodiments of the firewall controller 104 may be practiced. The description of FIG. 16 is intended to provide a brief, general description in conjunction with which the subject matter may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 16, a hardware and operating environment is provided that is applicable to the firewall controller operations described in the other figures and described above. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 16, a hardware and operating environment is provided that is applicable to the firewall controller 104 shown in the other figures. As shown in FIG. 16, one embodiment of the hardware and operating environment includes processing circuitry 1600 having one or more processing units coupled to the network interface circuitry 1602 and a memory circuitry 1604. The memory circuitry 1604 may include a ROM, e.g., a flash ROM, a RAM, e.g., a DRAM or SRAM, or the like and includes suitably configured program code 1606 to be executed by the processing circuitry so as to implement that above described functionalities of the firewall controller 104. The storage 1608 may include a mass storage, e.g., a hard disk or solid state disk, or the like. There may be only one or more than one processing unit, such that the processor circuitry 1600 of firewall controller 104 comprises a single central-processing unit (CPU), or a plurality of processing units, commonly referred to as a multiprocessor or parallel-processor environment. A multiprocessor system can include cloud computing environments.

Figure 17:
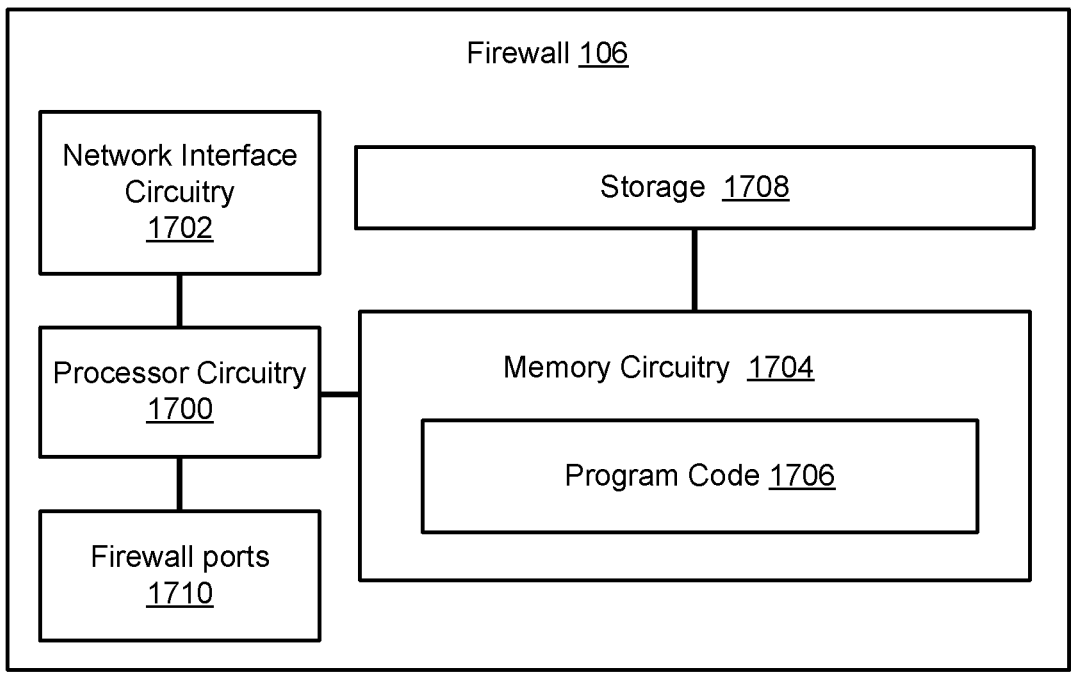
FIG. 17 is a block diagram of a firewall according to some embodiments.

FIG. 17 provides an overview diagram of a suitable computer hardware and computing environment in conjunction with which various embodiments of the firewall 106 may be practiced. The description of FIG. 17 is intended to provide a brief, general description in conjunction with which the subject matter may be implemented. In some embodiments, the subject matter is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 17, a hardware and operating environment is provided that is applicable to the firewall operations described in the other figures and described above. Moreover, those skilled in the art will appreciate that the subject matter may be practiced with other computer system configurations, including multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 17, a hardware and operating environment is provided that is applicable to the firewall shown in the other figures. As shown in FIG. 17, one embodiment of the hardware and operating environment includes processing circuitry 1700 having one or more processing units coupled to the network interface circuitry 1702 and a memory circuitry 1704. The memory circuitry 1704 may include a ROM, e.g., a flash ROM, a RAM, e.g., a DRAM or SRAM, or the like and includes suitably configured program code 1706 to be executed by the processing circuitry so as to implement that above described functionalities of the firewall 106 to open and close firewall ports 1700. The storage 1708 may include a mass storage, e.g., a hard disk or solid state disk, or the like. There may be only one or more than one processing unit, such that the processor circuitry 1700 of firewall 106 comprises a single central-processing unit (CPU), or a plurality of processing units, commonly referred to as a multiprocessor or parallel-processor environment. A multiprocessor system can include cloud computing environments.

Thus, example systems, methods, and tangible machine readable media for opening firewall ports for a specified time period and closing the firewall ports have been described. The advantages provided include reduction in security risk from having firewall ports open for indefinite time periods.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method in a firewall controller, the method comprising:
   receiving, via a control channel, a request from a device to open a port of a firewall controlled by the firewall controller such that a plurality of data packets is allowed to pass there through, the request comprising information comprising an identifier, a protocol identifier, and a time period the port of the firewall is to be open;
   determining that the protocol identifier identifies at least one of the plurality of data packets as a custom type;
   responsive to authenticating the request based on the identifier, and responsive to the protocol identifier identifying at least one of the plurality of data packets as a custom type, selecting a firewall port among a set of firewall ports of the firewall to open based on the protocol identifier and the firewall port being specified in the at least one of the plurality of data packets;
   opening the firewall port to allow the plurality of data packets to pass through the firewall port;
   transmitting, via the control channel, an open firewall notification to the device indicating that the firewall port is open; and
   responsive to the time period the port of the firewall is to be open expiring:
      closing the selected firewall port; and
      transmitting, via the control channel, an expired firewall port notice to the device, the expired firewall port notice comprising an indication that the selected firewall port has been closed.

2. The method of claim 1, wherein the request further comprises a source address and a destination address, and wherein opening the firewall port comprises opening the firewall port to allow data packets from the source address to pass through the firewall port to the destination address.

3. The method of claim 1, further comprising:
   receiving, from a monitoring service, a request to close a specified firewall port; and
   responsive to authenticating the request to close the specified firewall port, identifying that the specified firewall port maps to the firewall port among the set of firewall ports, and closing the firewall port.

4. The method of claim 3, further comprising transmitting a notification to the device via the control channel that the specified firewall port has been closed.

5. The method of claim 3, further comprising, responsive to authenticating the request to close the specified firewall port:
   identifying that the specified firewall port maps to the firewall port among the set of firewall ports and to at least one other firewall port in the set of firewall ports; and
   closing the firewall port among the set of firewall ports and the at least one other firewall port.

6. The method of claim 1, further comprising:
   responsive to receiving a close port request from the device prior to the time period expiring, closing the selected firewall port.

7. A firewall controller comprising:
   a communication interface;

a processor operatively coupled to the communication interface, the processor configured to perform operations comprising:
receiving, via a control channel, a request from a device to open a port of a firewall, the request comprising information comprising an identifier, a protocol identifier and a time period the port is to be opened;
responsive to authenticating the request based on the identifier, selecting a firewall port among a set of firewall ports of the firewall to open based on the protocol identifier;
opening the selected firewall port to allow data packets to pass there through;
transmitting, via the control channel, an open firewall port notification to the device indicating that the selected firewall port is open;
receiving a close port request from a destination address of the data packets to close the selected firewall port; and
responsive to authenticating the destination address:
closing the selected firewall port; and
transmitting, via the control channel, a closed firewall port notice to the device, the closed firewall port notice comprising an indication that the selected firewall port has been closed.

8. The firewall controller of claim 7, wherein the request to open the port of the firewall further comprises a source address and a destination address, and wherein opening the selected firewall port comprises opening the selected firewall port and allowing data packets from the source address to pass through the selected firewall port to the destination address.

9. A method in a server device, the method comprising:
intercepting a data packet transmitted from a process source, the packet having a process source identifier, a source address, and a destination address that is beyond a firewall;
determining if a firewall port of a firewall is open for the packet to be sent to the destination address from the process source responsive to authenticating the process source based on the process source identifier;
responsive to determining the firewall port is not open:
buffering the data packet;
transmitting, via a control channel, a request to a firewall controller to open the firewall port, the request comprising information comprising an identifier, a protocol identifier, and a time period the firewall port is to be open;
receiving, via the control channel, an open firewall port notification indicating that the firewall port has been opened; and
sending the buffered data packet through the firewall port; and
responsive to determining the firewall port is open, sending the data packet through the firewall port.

10. The method of claim 9 wherein the request further comprises the source address and the destination address and receiving the open firewall port notification comprises receiving, via the control channel, the open firewall port open notification indicating that the firewall port has been opened to allow data packets from the source address to pass through the firewall port to the destination address.

11. The method of claim 9, wherein determining if the firewall port is open comprises:
determining if an interceptor state table contains an entry comprising the source address, the destination address, the protocol identifier, an identification of the firewall port, and a state of the firewall port indicating that the firewall port is active.

12. The method of claim 11, further comprising:
responsive to transmitting the request to the firewall controller to open the firewall port:
adding an entry to an interceptor state table, the entry comprising the source address, the destination address, the protocol, the time period, and setting the state of the firewall port to indicate the firewall port is being established;
responsive to receiving the open firewall port notification, changing the state of the firewall port to indicate the firewall port is active.

13. The method of claim 12 further comprising:
receiving a port closed notification that indicates the firewall port has been closed;
responsive to receiving the port closed notification, updating the entry in the interceptor state table by changing the state of the firewall port to indicate the firewall port is closed.

14. The method of claim 9 further comprising:
receiving an expired firewall port notice comprising an indication that the firewall port has been closed due to the time period expiring;
intercepting a second data packet transmitted from the source address to the destination address;
buffering the second data packet;
transmitting, via the control channel, a second request to the firewall controller to open the firewall port, the second request comprising information comprising the identifier, the protocol identifier, and a second time period the firewall port is to be open;
receiving an open firewall port notification, via the control channel, that the firewall port has been opened; and
sending the buffered second data packet through the firewall port.

15. A server device comprising:
a plurality of process sources, each having a unique process source identifier; an interceptor circuit configured to:
intercept a data packet having a process source identifier and transmitted from one of the plurality of processes, the data packet having a source address and a destination address that is beyond a firewall;
responsive to authenticating the one of the plurality of sources based on the process source identifier:
determine, based on the source address, if a firewall port is open for the data packet to be sent to the destination address from the source address;
responsive to a determination that the firewall port is not open:
buffer the data packet in a buffer circuit;
transmit, via a control channel, a request to a firewall controller to open the firewall port, the request comprising information comprising an identifier, a protocol identifier, and a time period the port of the firewall is to be open;
receive, via the control channel, an open firewall port notification indicating that the firewall port has been opened; and
send the buffered data packet through the firewall port to the destination address;
responsive to a determination that the firewall port is open, send the data packet through the firewall port to the destination address;

receive an expired firewall port notice comprising an indication that the firewall port has been closed due to the time period expiring.

16. The server device of claim 15, wherein the interceptor circuit is further configured to:
  intercepting a second data packet having the process source identifier being transmitted to the destination address after the expired firewall port notice was received;
  buffering the second data packet;
  transmitting, via the control channel, a second request to the firewall controller to open the firewall port, the second request comprising information comprising the identifier, the protocol identifier, and a second time period the firewall port is to be open;
  receiving an open firewall port notification, via the control channel, that the firewall port has been opened; and
  sending the buffered second data packet through the firewall port.

17. The server device of claim 15, further comprising a monitoring circuit configured to:
  monitor the flow of packets from the source address to the destination address through the firewall port;
  detect a change in a pattern of the flow of packets, the change indicating that the pattern is a suspicious pattern of flow of packets; and
  responsive to detecting the change in the pattern, perform one of sending an alert to the process source associated with the source address of the detected change or transmitting a port close request to the firewall controller to close the firewall port.

18. The server device of claim 15, wherein the interceptor circuit is further configured to:
  receive an unblock command and a password for the unblock command from one of the plurality of processes, the unblock command comprising an identification of a firewall port to be opened;
  responsive to authenticating the unblock command based on the password, transmit, via the control channel, an unblock request to the firewall controller to open the firewall port for a pre-determined amount of time.

* * * * *